United States Patent
Drennen et al.

(10) Patent No.: US 9,308,990 B2
(45) Date of Patent: Apr. 12, 2016

(54) VOICE COIL LINEAR ACTIVATED PARK BRAKE

(71) Applicant: Goodrich Corporation, Charlotte, NC (US)

(72) Inventors: David B. Drennen, Bellbrook, OH (US); Kevin Rehfus, Troy, OH (US); Robert French, Beavercreek, OH (US); Harald Klode, Centerville, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 98 days.

(21) Appl. No.: 14/292,005

(22) Filed: May 30, 2014

(65) Prior Publication Data
US 2015/0344130 A1  Dec. 3, 2015

(51) Int. Cl.
*F16D 121/18* (2012.01)
*B64C 25/44* (2006.01)
*F16D 121/00* (2012.01)

(52) U.S. Cl.
CPC .............. *B64C 25/44* (2013.01); *F16D 2121/00* (2013.01)

(58) Field of Classification Search
CPC ... F16D 2121/00; F16D 63/002; F16D 63/00; F16D 63/006; F16D 63/008; F16D 27/08; F16D 27/00; F16D 27/10; H02K 49/00; B64C 25/44
See application file for complete search history.

(56) References Cited

U.S. PATENT DOCUMENTS

| 2,057,876 | A | * | 10/1936 | Berry | F16D 27/08 192/111.7 |
| 2,430,174 | A | * | 11/1947 | Hoover | F16D 27/08 192/18 B |
| 2,675,900 | A | * | 4/1954 | Malick | F16D 27/08 192/84.2 |
| 2,717,066 | A | * | 9/1955 | Malick | F16D 27/08 192/84.91 |
| 2,727,605 | A | * | 12/1955 | Rabinow | F16D 27/00 192/18 B |
| 2,988,189 | A | * | 6/1961 | Thomas | F16D 23/12 192/40 |

(Continued)

FOREIGN PATENT DOCUMENTS

FR  2785656  5/2000

OTHER PUBLICATIONS

Extended European Search Report dated Jan. 4, 2016 in European Application No. 15168483.4.

*Primary Examiner* — Robert A Siconolfi
*Assistant Examiner* — James Hsiao
(74) *Attorney, Agent, or Firm* — Snell & Wilmer L.L.P

(57) ABSTRACT

A park brake systems and methods are disclosed. According to various embodiments, park brake systems comprising a tapered motor shaft having a first diameter and a second diameter, the second diameter being greater than the first diameter, a voice coil disposed at least partially around a circumference of a bobbin, a first one-way clutch housed at least partially within the bobbin, the first one-way clutch disposed coaxial to the tapered motor shaft, and an annular magnet disposed coaxial to the tapered motor shaft and proximal to the first one-way clutch, wherein, in response to a first voltage applied to the voice coil, the first one-way clutch translates axially in a first direction with respect to the tapered motor shaft and engages with the second diameter are disclosed.

14 Claims, 7 Drawing Sheets

(56) References Cited

U.S. PATENT DOCUMENTS

| | | | | |
|---|---|---|---|---|
| 4,125,790 A * | 11/1978 | Stratienko | ............... | F16D 21/06 251/129.03 |
| 4,299,315 A * | 11/1981 | Ohtsuka | ................. | F16H 41/24 192/3.3 |
| 4,788,463 A * | 11/1988 | Layh | ....................... | F16D 51/00 188/161 |
| 4,907,464 A * | 3/1990 | Isozumi | ................ | F02N 15/066 290/48 |
| 5,185,542 A * | 2/1993 | Lazorchak | ............. | F16D 55/28 310/105 |
| 5,254,528 A * | 10/1993 | Takahata | ................ | H02K 49/00 188/164 |
| 5,490,583 A * | 2/1996 | Anderson | ............. | F16D 55/36 188/161 |
| 5,685,398 A * | 11/1997 | Marshall | ................ | F16D 55/28 164/108 |
| 5,847,478 A * | 12/1998 | Usui | ..................... | F16D 27/112 188/161 |
| 5,889,348 A * | 3/1999 | Muhlberger | ............. | H02K 1/27 310/156.02 |
| 5,988,342 A * | 11/1999 | Ito | ............................ | B23Q 1/28 188/67 |
| 6,132,332 A * | 10/2000 | Yasui | ................. | B60K 17/3505 477/36 |
| 6,244,403 B1 | 6/2001 | Ito et al. | | |
| 6,471,017 B1 * | 10/2002 | Booz | ....................... | F16D 55/02 188/162 |
| 7,510,058 B2 * | 3/2009 | Ether | ...................... | B60T 7/107 188/156 |
| 7,714,685 B2 * | 5/2010 | Pescheck | ................ | F16D 27/02 181/161 |
| 7,717,240 B2 * | 5/2010 | Anderson | ............. | B60T 13/741 188/156 |
| 8,371,423 B2 * | 2/2013 | Hehl, Sr. | ................ | F16D 27/115 188/267 |
| 8,616,343 B2 * | 12/2013 | Wako | ....................... | F16B 2/16 188/265 |
| 9,051,981 B2 * | 6/2015 | Gitnes | .................... | F16D 59/02 |
| 2003/0042802 A1 | 3/2003 | Pierre et al. | | |
| 2004/0055835 A1 | 3/2004 | Klode et al. | | |
| 2005/0082908 A1 | 4/2005 | Klode et al. | | |
| 2005/0285473 A1 * | 12/2005 | Kobayashi | ........... | H02K 7/1166 310/89 |
| 2008/0071455 A1 * | 3/2008 | Shiraki | ............... | B60L 15/2018 701/70 |
| 2008/0097269 A1 * | 4/2008 | Weinberg | ................ | A61F 2/68 602/16 |
| 2009/0032354 A1 * | 2/2009 | Marsh | ..................... | F16D 41/22 192/48.1 |
| 2013/0087427 A1 * | 4/2013 | Kato | ............... | B60T 1/005 192/219.4 |
| 2013/0209010 A1 * | 8/2013 | Gruber | .................. | B62D 5/005 384/91 |
| 2014/0345999 A1 * | 11/2014 | Kitayama | ............... | F16D 27/10 192/44 |

\* cited by examiner

US 9,308,990 B2

VOICE COIL LINEAR ACTIVATED PARK BRAKE

FIELD

The present disclosure relates to braking systems and, more specifically, to a bi-stable voice coil linear activated park brake.

BACKGROUND

Typical aircraft brakes comprise one or more rotors and stator that, when compressed axially, cause an aircraft wheel to resist rotation. While parked, it may be desirable to maintain brake compression to resist unwanted movement of the aircraft.

SUMMARY

Park brake systems comprising a tapered motor shaft having a first diameter and a second diameter, the second diameter being greater than the first diameter, a spring disposed at least partially around a circumference of the tapered motor shaft, a voice coil disposed at least partially around a circumference of a bobbin, a first one-way clutch housed at least partially within the bobbin, the first one-way clutch disposed coaxial to the tapered motor shaft, and an annular magnet disposed coaxial to the tapered motor shaft and proximal to the first one-way clutch, wherein, in response to a first voltage applied to the voice coil, the first one-way clutch translates axially in a first direction with respect to the tapered motor shaft and engages with the second diameter, and wherein, in response to a second voltage applied to the voice coil, the first one-way clutch translates axially in a second direction and is disposed about the first diameter are disclosed.

Methods comprising applying a first voltage to a voice coil disposed at least partially around a circumference of a bobbin, wherein a first one-way clutch is housed at least partially within the bobbin, the first one-way clutch disposed coaxial to a tapered motor shaft having a first diameter and a second diameter, the second diameter being greater than the first diameter, translating the bobbin and the first one-way clutch, translating the first one-way clutch axially in a first direction with respect to the tapered motor shaft, and engaging the first one-way clutch to the second diameter, wherein rotation of the tapered motor shaft is prevented in a first rotational direction in response to engagement of the first one-way clutch with the tapered motor shaft are disclosed.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, electrical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

An aircraft brake system may comprise an end plate distal from a plurality of interleaved rotor disks and stator disks which together form a brake heat sink. Each rotor disk may be coupled to the wheel for rotation therewith and each stator disk may be coupled to the wheel support against rotation. The brake mechanism also generally includes a torque tube and a back leg on which a pressure plate, end plate and stator disks are slidably mounted against rotation relative to the wheel and rotor disks. The stator disks may comprise two wear faces and the pressure plate may comprise a single wear face. The rotors disks and stator disks may be formed of a friction material, such a carbon/carbon or a carbon metallic matrix material. A brake head may house the piston motor or one or more rams that extend to move the pressure plate and axially compress the brake disk stack against the end plate.

In various embodiments, a brake system may comprise a brake system controller ("BSC") coupled to one or more electromechanical actuator controller ("EMACs"), which may drive an electromechanical actuator ("EMA"). The BSC may be in communication with a brake pedal, and thus may control the EMACs in accordance with pilot/copilot braking commands. The EMA may be coupled to or otherwise operate a pressure generating device, such as, for example, a ball screw, a ram, and/or the like. In operation, the EMA may cause the pressure generating device to move and/or exert a force on other brake system structures, such as a brake disk or pad to exert a stopping force on a wheel or other suitable moving structure. This stopping force may load and/or exert a corresponding force on the EMA structures such as, for example, an EMA housing.

Figure 1:
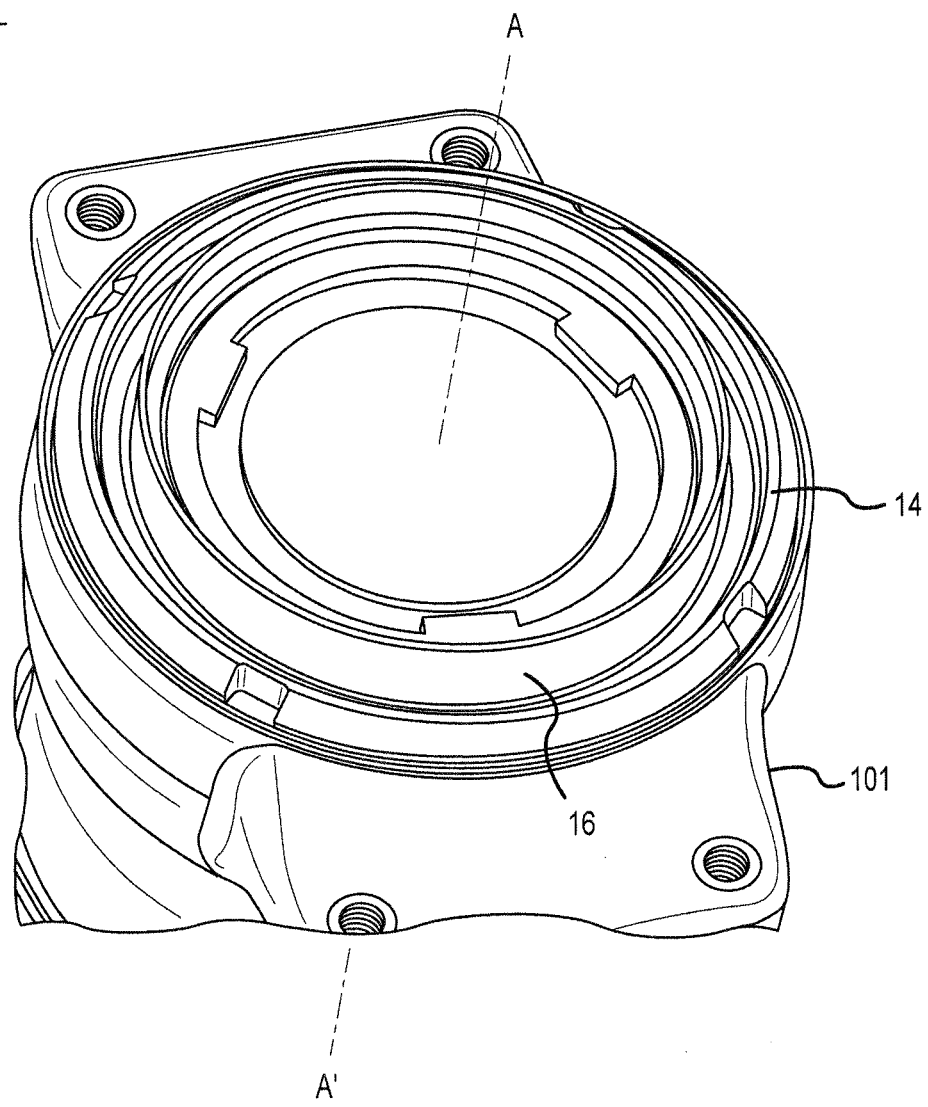
FIG. 1 illustrates an electromechanical actuator, in accordance with various embodiments.

For example, with reference to FIG. 1, a perspective view of an EMA 10 is shown. The EMA may extend along the axis marked A-A', with A being located near a distal portion of EMA 10 and A' being near a proximal portion of EMA 10. The EMA 10 may, as described above, be involved in the application of a braking force to an aircraft wheel. The EMA 10 assembly may comprise an EMA housing 101, which may extend along the axis A-A'. The EMA housing 101 may house a variety of components, including, for example, a ball nut 14, a ball screw 16, and a motor drive unit. Generally, the motor drive unit may drive the ball screw 16 through a plurality of rotations. As the ball screw 16 rotates, the ball nut 14 may translate distally and/or proximally along the axis A-A' (depending upon the direction of rotation of the ball screw 16). The ball nut 14 may be coupled to a disc or "puck," at a distal end thereof. The puck may exert a pressure against a brake stack coupled to an aircraft wheel to impede or halt a rolling motion of the wheel. The EMA may include a bi-stable park brake. For example, the EMA may comprise a park brake system (as described below with reference to FIG. 2).

A brake may be used to prevent an EMA from rotating the ball screw in a first direction in one state, while permitting rotation of the ball screw in the first direction in a second state. For example, in a bi-stable brake, prevention of ball screw rotation may be advantageous in a parking brake mode. A bi-stable brake may be switched from one state to another vis-à-vis the brake stack. The brake stack may take a first state that prevents ball screw rotation (i.e., a "locked state") and a second state that allows ball screw rotation (i.e., an "unlocked state").

Figure 2:
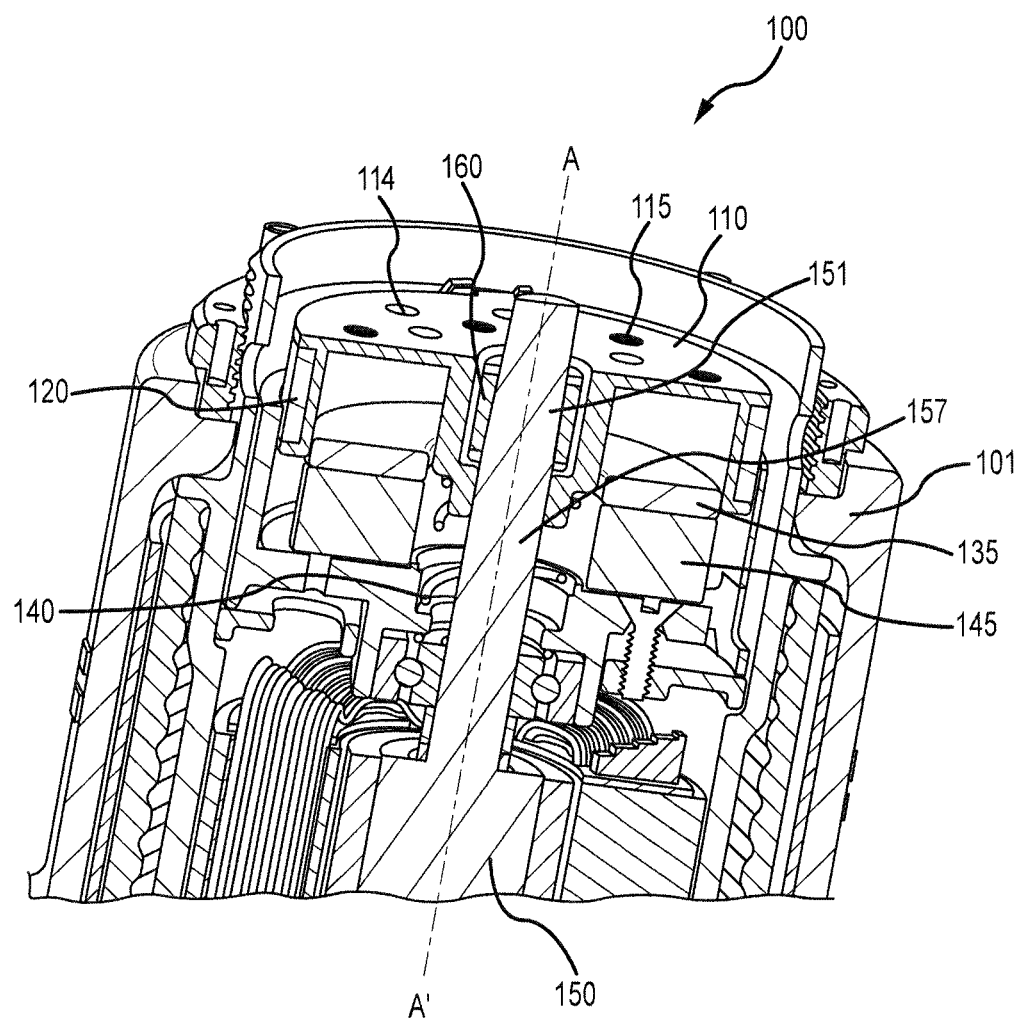
FIG. 2 illustrates a cross-sectional view of a park brake system in a disengaged state, in accordance with various embodiments.
Figure 4:
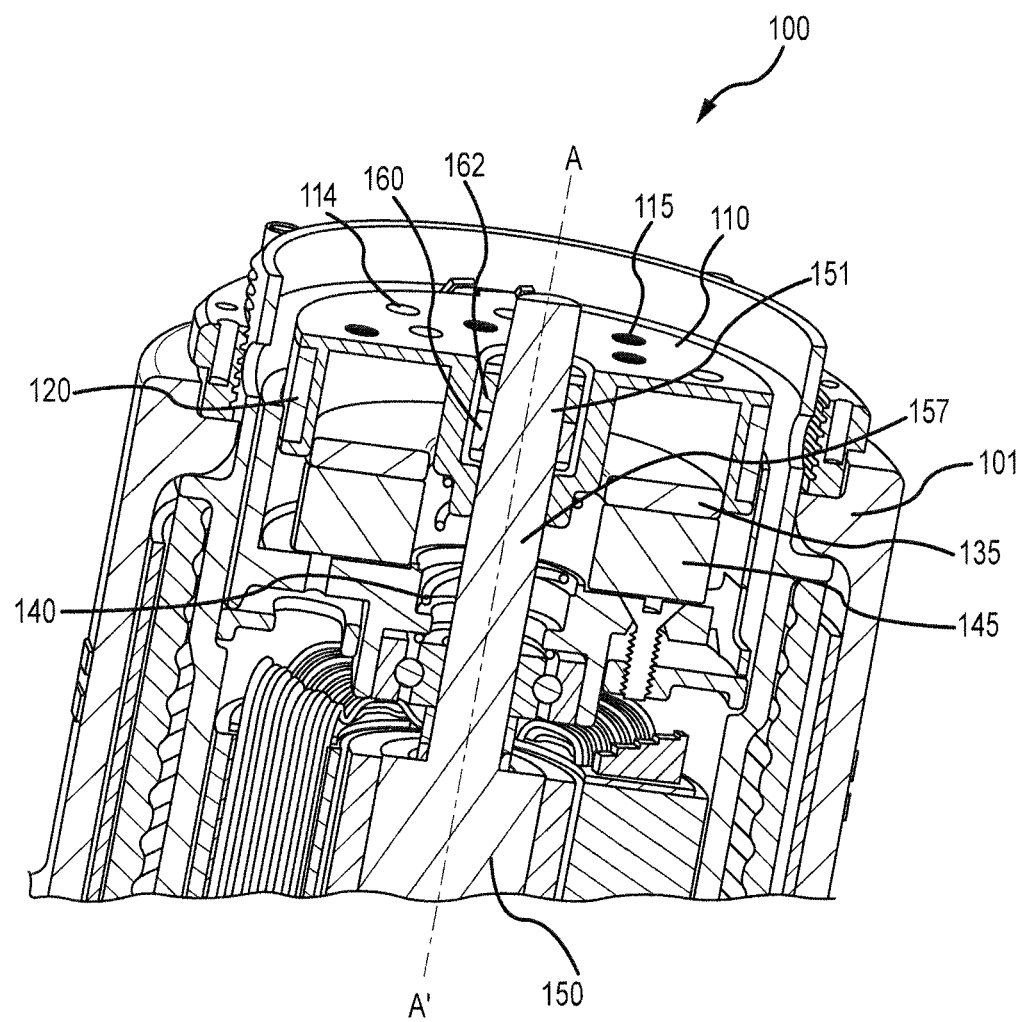
FIG. 4 illustrates a cross-sectional view of a park brake system having a second one-way clutch, in accordance with various embodiments.

For example, with reference to FIG. 2, a park brake system 100 disposed in EMA housing 101, in accordance with various embodiments, is illustrated. In various embodiments, park brake system 100 may comprise a tapered motor shaft 150 having a first diameter (at section 151) and a second diameter (at section 157). In accordance with various embodiments, the second diameter may be greater than the first diameter. For example, in various embodiments, motor shaft 150 may contain a gradual taper between section 151 and section 157, as illustrated in FIGS. 2 and 4. According to various embodiments, a motor shaft may contain an abrupt change between a first diameter and a second diameter. In various embodiments, park brake system 100 may comprise a spring 140 disposed at least partially around a circumference of the tapered motor shaft 150.

According to various embodiments, a voice coil 120 may be disposed at least partially around a circumference of a bobbin 110. In various embodiments, voice coil 120 may be a wire of copper or any other material now known or hereinafter developed capable of creating a magnetic field. According to various embodiments, the bobbin 110 may comprise a ferromagnetic insert 115. In various embodiments, ferromagnetic insert 115 may be disposed in apertures 114 of bobbin 110. Furthermore, in various embodiments, the spring 140 may exert a distal force on the bobbin 110 (e.g., towards A along axis A-A').

In various embodiments, park brake system 100 may also comprise a first one-way clutch 160 housed at least partially within the bobbin 110. In various embodiments, the first one-way clutch 160 may be disposed coaxial to the tapered motor shaft 150 (e.g., along axis A-A'). First one-way clutch 160 is not particularly limited according to various embodiments and, thus, may include any now known or hereinafter developed one-way clutch. For example, various one-way clutches may include at one of an HF type one-way clutch, an HFL type one-way clutch, an NCM type one-way clutch, an NHF type one-way clutch, an NCU type one-way clutch, an NCZ type one-way clutch, an NCZC type one-way clutch, an NCZX type one-way clutch, and an NCUX type one-way clutch, all commercially available from the NTN® Corporation.

Moreover, in various embodiments, and with momentary reference to FIG. 4, park brake system 100 may comprise a second one-way clutch 162 housed at least partially within the bobbin 110. In various embodiments, the first one-way clutch 160 may be the same as the second one-way clutch 162. In various embodiments, the second one-way clutch 162 may be different than the first one-way clutch 160. According to various embodiments, the first one-way clutch 160 may permit rotation in a first rotational direction, while second one-way clutch 162 may permit rotation in a second rotational direction that is opposite the first rotational direction. In various embodiments, the first one-way clutch 160 and the second one-way clutch 162 may be disposed to prevent rotation of the tapered motor shaft 150 in response to engagement with the tapered motor shaft 150.

With reference back to FIG. 2, in various embodiments, park brake system 100 may comprise an annular magnet 145 disposed coaxial to the tapered motor shaft 150 and proximal to the first one-way clutch 160. Moreover, in various embodiments, park brake system 100 may comprise an annular steel ring 135, which may be disposed coaxial to the tapered motor shaft 150 and proximal to the annular magnet 145. Accordingly, in various embodiments, voice coil 120, bobbin 110, annular magnet 145, and annular steel ring 135 may form a component of a linear motor.

Accordingly, in various embodiments, when a first voltage is applied to the voice coil 120, a magnetic axial force may be generated due to a flux field created between the annular magnet 145 and the annular steel ring 135. Due to the axial force, the bobbin 110, which carries the first one-way clutch 160, may translate axially in a first direction (e.g., proximally from section 151 to section 157) with respect to the tapered motor shaft 150 and may engage with the second diameter of section 157.

Figure 3:
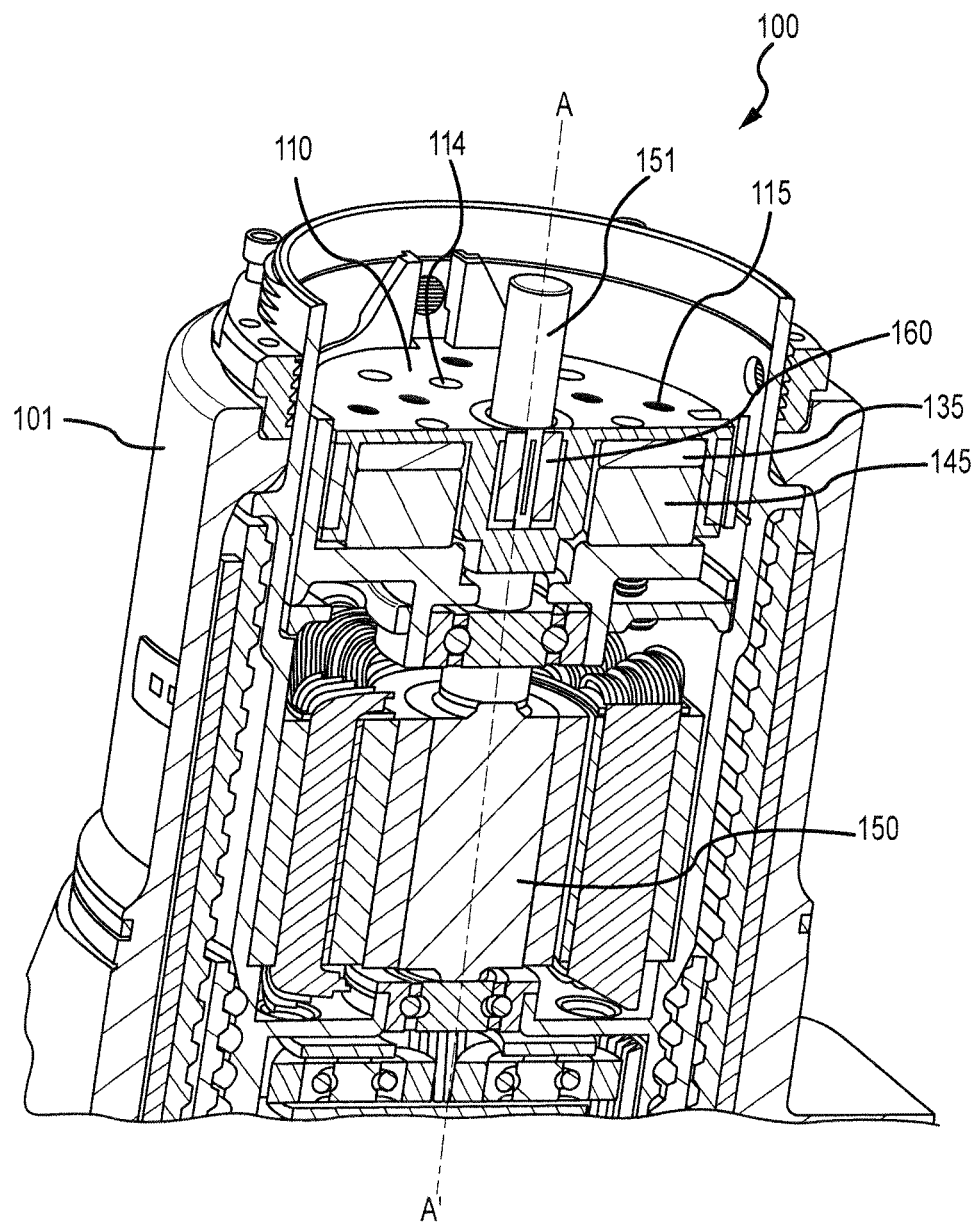
FIG. 3 illustrates a cross-sectional view of a park brake system in an engaged state, in accordance with various embodiments.

For example, with reference to FIG. 3, park brake system 100 is illustrated in an engaged state. As previously described, in various embodiments, a first voltage may be applied to the voice coil 120 and, thus, the bobbin 110 and the first one-way clutch 160 may translate axially. In various embodiments, bobbin 110 may translate axially until contacting the annular steel ring 135. Thus, in various embodiments, in response to the first voltage applied to the voice coil 120, the distal force of spring 140 may act in a distal direction.

According to various embodiments, bobbin 110 may be held in contact with the annular steel ring 135 due to the proximity of the bobbin 110 and the ferromagnetic insert 115 to the annular magnet 145. Thus, in various embodiments, the first one-way clutch 160 may maintain engagement with the second diameter of section 157 (shown in FIG. 2) of tapered motor shaft 150.

According to various embodiments, when a second voltage is applied to the voice coil 120, the first one-way clutch 160 may translate axially in a second direction (e.g., a distal direction) and may be disposed about the first diameter of section 151. For example, in various embodiments, application of a second voltage may allow the force of spring 140 to overcome the force of annular magnet 145 and translate bobbin 110 and one-way clutch 160 distally along motor shaft 150. In various embodiments, the second voltage may be reversed relative to the first voltage.

Figure 5:
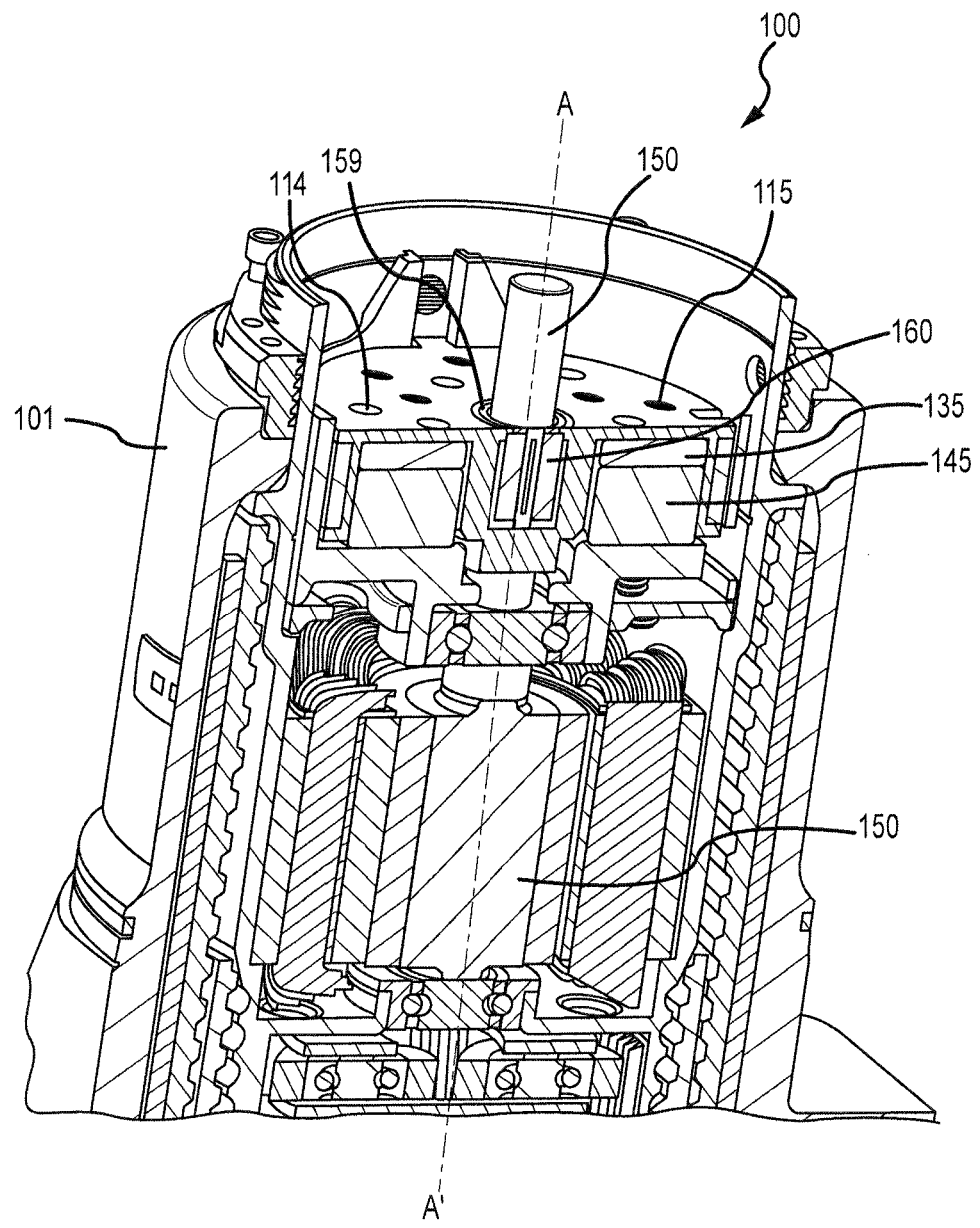
FIG. 5 illustrates a cross-sectional view of a park brake system with a torque hinge, in accordance with various embodiments.

With reference to FIG. 5, park brake system 100 is illustrated with a limiting torque device (e.g., a torque hinge 159) disposed between the first one-way clutch 160 and the tapered motor shaft 150. In various embodiments, the first one-way clutch 160 may indirectly engage tapered motor shaft 150 via torque hinge 159 as an intermediary. As used herein, the term "torque hinge" may include any torque limiter, torque limiting device, or other suitable device now known or hereinafter developed that protect mechanical equipment from damage by mechanical overload. Without being limited to any theory, it is believed that in various embodiments, the use of a limiting torque device may allow for the first one-way clutch 160 to indirectly engage the tapered motor shaft 150, while limiting the maximum torque when the park brake system 100 is in the engaged state. Accordingly, in various embodiments, mechanical wear and damage may be avoided by indirectly engaging the first one-way clutch 160 to tapered motor shaft 150 with a limiting torque device (e.g., a torque hinge 159). Thus, in various embodiments, torque hinge 159 may prevent mechanical overload if excessive force were to be placed on motor shaft 150 while the park brake system 100 is in an engaged state.

Figure 6:
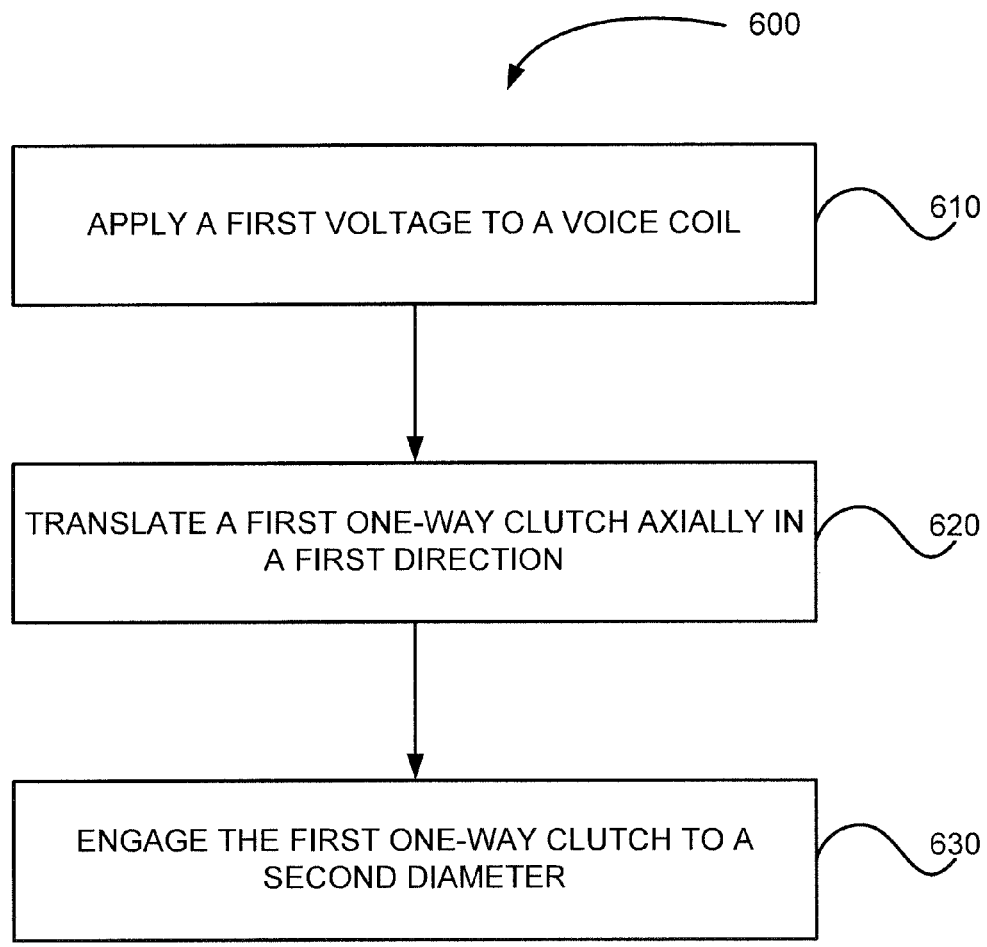
FIG. 6 illustrates a method of engaging a park brake system in accordance, with various embodiments.

With reference to FIGS. 1 and 6, a method 600 for engaging a park brake system 100 is illustrated. In various embodiments, method 600 may comprise applying a first voltage to a voice coil 120 (step 610). According to various embodiments, the first voltage may be applied by an electromechanical actuator controller ("EMAC"). Method 600 may also comprise translating a first one-way clutch 160 axially in a first direction with respect to the tapered motor shaft 150 (step 620). According to various embodiments, method 600 may comprise engaging the first one-way clutch 160 with the second diameter (step 630). In various embodiments, the rotation of the tapered motor shaft 150 may be prevented in a first rotational direction in response to engagement of the first one-way clutch 160 with the tapered motor shaft 150.

According to various embodiments, method 600 is not particularly limited and may include a second one-way clutch 162 housed at least partially within the bobbin 110 (as shown in FIG. 4). In various embodiments, the first one-way clutch 160 and the second one-way clutch 162 may be disposed to prevent rotation in both clockwise and counterclockwise directions of the tapered motor shaft 150 when in an engaged state.

Figure 7:
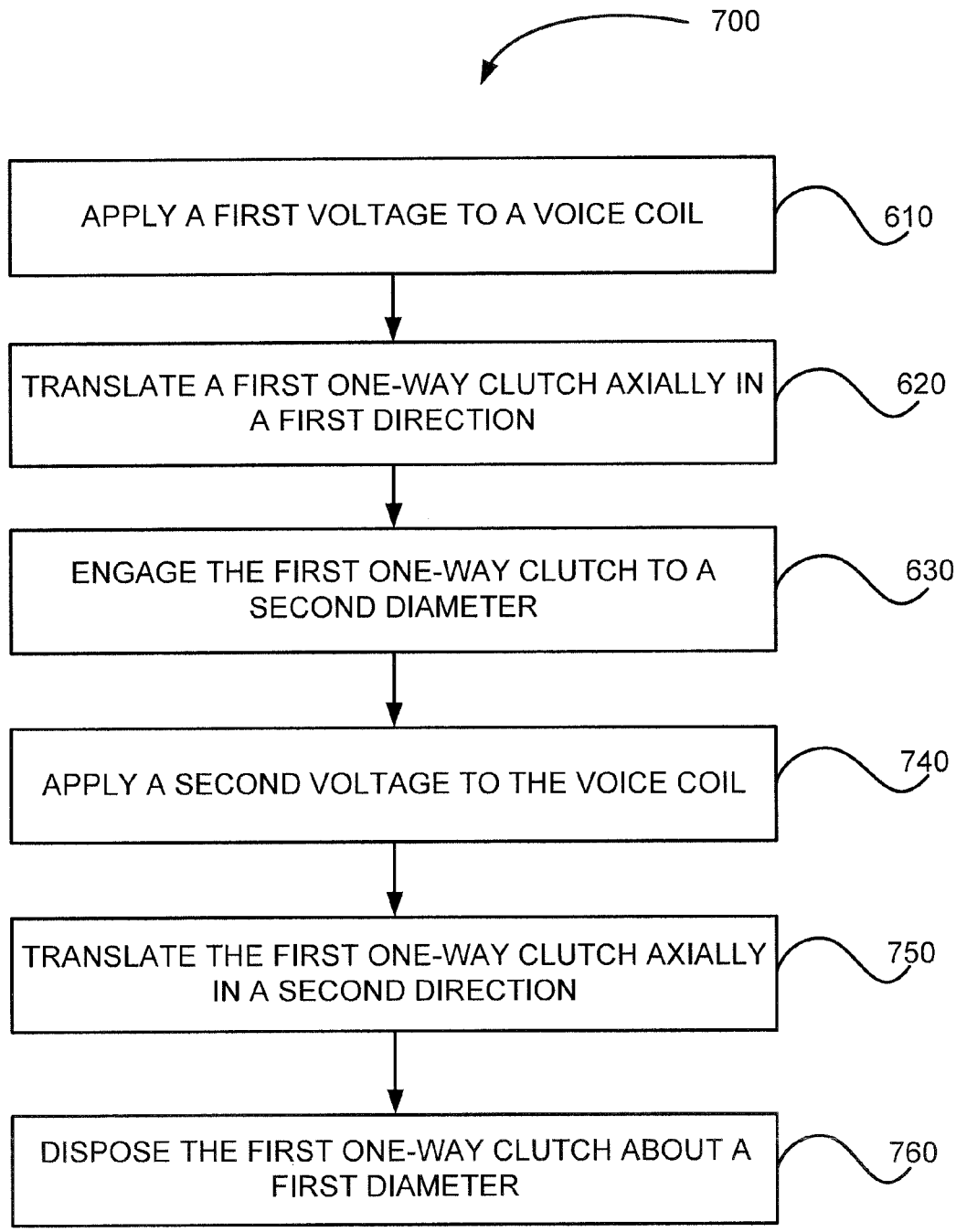
FIG. 7 illustrates a method of disengaging a park brake system in accordance, with various embodiments.

With reference to FIG. 7, a method 700, in accordance with various embodiments, is illustrated. In various embodiments, method 700 may comprise applying a first voltage to a voice coil 120, as shown in FIG. 2 (step 610). In various embodiments, the voice coil 120 may be disposed at least partially around a circumference of a bobbin 110, wherein a first one-way clutch 160 is housed at least partially within the bobbin 110, the first one-way clutch 160 disposed coaxial to a tapered motor shaft 150 having a first diameter and a second diameter, the second diameter being greater than the first diameter. Method 700 may also comprise translating the first one-way clutch 160 axially in a first direction with respect to the tapered motor shaft 150 (step 620). According to various embodiments, method 700 may comprise engaging the first one-way clutch 160 to the second diameter (step 630). In various embodiments, the rotation of the tapered motor shaft 150 may be prevented in a first rotational direction in response to engagement of the first one-way clutch 160 with the tapered motor shaft 150.

Method 700 may also comprise applying a second voltage to the voice coil 120 (step 740). In various embodiments, method 700 may include translating the first one-way clutch 160 axially in a second direction (step 750). Method 700 may also include disposing the first one-way clutch 160 about the first diameter (step 760), in accordance with various embodiments. According to various embodiments, disposing the first one-way clutch 160 about the first diameter of section 151 may disengage the first one-way clutch 160 from the second diameter of section 157 of tapered motor shaft 150.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. §112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:
1. A park brake system comprising:
    a tapered motor shaft having a first diameter and a second diameter, the second diameter being greater than the first diameter;
    a spring disposed at least partially around a circumference of the tapered motor shaft;
    a voice coil disposed at least partially around a circumference of a bobbin comprising a ferromagnetic insert;

a first one-way clutch housed at least partially within the bobbin, the first one-way clutch disposed coaxial to the tapered motor shaft; and an annular magnet disposed coaxial to the tapered motor shaft and proximal to the first one-way clutch;

wherein, in response to a first voltage applied to the voice coil, the first one-way clutch translates axially in a first direction with respect to the tapered motor shaft and engages with the second diameter, and wherein, in response to a second voltage applied to the voice coil, the first one-way clutch translates axially in a second direction and is disposed about the first diameter.

2. The park brake system of claim 1, further comprising a second one-way clutch housed at least partially within the bobbin.

3. The park brake system of claim 2, wherein the first one-way clutch and the second one-way clutch are disposed to prevent rotation of the tapered motor shaft in response to engagement with the tapered motor shaft.

4. The park brake system of claim 1, further comprising an annular steel ring disposed coaxial to the tapered motor shaft and proximal to the annular magnet.

5. The park brake system of claim 1, wherein the second voltage is reversed relative to the first voltage.

6. The park brake system of claim 1, wherein the spring exerts a distal force on the bobbin.

7. The park brake system of claim 6, wherein, in response to the first voltage applied to the voice coil, the distal force acts in a direction opposite the first direction.

8. The park brake system of claim 1, wherein the first one-way clutch is at least one of an HF type one-way clutch, an HFL type one-way clutch, an NCM type one-way clutch, an NHF type one-way clutch, an NCU type one-way clutch, an NCZ type one-way clutch, an NCZC type one-way clutch, an NCZX type one-way clutch, and an NCUX type one-way clutch.

9. An electromechanical actuator ("EMA"), comprising the park brake system of claim 1.

10. A method comprising:
applying a first voltage to a voice coil disposed at least partially around a circumference of a bobbin comprising a ferromagnetic insert, wherein a first one-way clutch is housed at least partially within the bobbin, the first one-way clutch disposed coaxial to a tapered motor shaft having a first diameter and a second diameter, the second diameter being greater than the first diameter;

translating the first one-way clutch axially in a first direction with respect to the tapered motor shaft; and engaging the first one-way clutch to the second diameter, wherein rotation of the tapered motor shaft is prevented in a first rotational direction in response to engagement of the first one-way clutch with the tapered motor shaft.

11. The method of claim 10, further comprising:
applying a second voltage to the voice coil;
translating the first one-way clutch axially in a second direction; and
disposing the first one-way clutch about the first diameter.

12. The method of claim 10, further comprising a second one-way clutch housed at least partially within the bobbin.

13. The method of claim 12, wherein the first one-way clutch and the second one-way clutch are disposed to prevent rotation of the tapered motor shaft when in an engaged state.

14. The method of claim 10, wherein the first voltage is applied by an electromechanical actuator controller ("EMAC").

* * * * *